(12) United States Patent
Yokura et al.

(10) Patent No.: US 8,544,449 B2
(45) Date of Patent: Oct. 1, 2013

(54) FUEL SUPPLY DEVICE

(75) Inventors: Yasufumi Yokura, Wako (JP); Atsushi Ito, Wako (JP); Yoichi Takahashi, Wako (JP); Tsuyoshi Izaki, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 461 days.

(21) Appl. No.: 12/918,359

(22) PCT Filed: Feb. 18, 2009

(86) PCT No.: PCT/JP2009/052755
§ 371 (c)(1),
(2), (4) Date: Sep. 9, 2010

(87) PCT Pub. No.: WO2009/110313
PCT Pub. Date: Sep. 11, 2009

(65) Prior Publication Data
US 2011/0056465 A1 Mar. 10, 2011

(30) Foreign Application Priority Data
Mar. 6, 2008 (JP) ................. P2008-056846

(51) Int. Cl.
*F02M 55/02* (2006.01)
*F02B 13/00* (2006.01)

(52) U.S. Cl.
USPC ............ 123/468; 123/575; 701/109; 701/113

(58) Field of Classification Search
USPC .................. 123/468, 179.16, 672, 685, 686, 123/697, 575; 701/109, 113
See application file for complete search history.

(56) References Cited

U.S. PATENT DOCUMENTS

| | | | | |
|---|---|---|---|---|
| 4,735,184 A * | 4/1988 | Kasanami et al. | ............ | 123/491 |
| 5,090,389 A * | 2/1992 | Oota | ............... | 123/685 |
| 5,197,450 A * | 3/1993 | Kitajima et al. | ............... | 123/685 |
| 5,249,130 A * | 9/1993 | Mamiya et al. | ............... | 701/109 |
| 5,357,927 A | 10/1994 | Saito et al. | | |
| 5,390,640 A | 2/1995 | Saito et al. | | |
| 5,394,857 A * | 3/1995 | Yamakawa | .................... | 123/686 |
| 5,402,763 A | 4/1995 | Saito et al. | | |
| 5,542,394 A * | 8/1996 | Tomisawa | ..................... | 123/491 |
| 5,709,198 A * | 1/1998 | Sagisaka et al. | ............... | 123/684 |
| 6,467,458 B1 * | 10/2002 | Suzuki et al. | ................ | 123/491 |
| 7,047,944 B2 * | 5/2006 | Toth | .............................. | 123/491 |
| 7,523,744 B2 | 4/2009 | Ayame | | |
| 7,971,580 B2 * | 7/2011 | Nakamura et al. | ............. | 123/575 |
| 2007/0095331 A1 | 5/2007 | Ayame | | |

FOREIGN PATENT DOCUMENTS

| | | |
|---|---|---|
| CN | 2793348 Y | 7/2006 |
| JP | 63-005131 A | 1/1988 |
| JP | 05-026087 A | 2/1993 |
| JP | 05-340286 A | 12/1993 |
| JP | 2007-146831 A | 6/2007 |
| JP | 2008-008301 A | 1/2008 |

* cited by examiner

*Primary Examiner* — Thomas Moulis
(74) *Attorney, Agent, or Firm* — Carrier Blackman & Associates, P.C.; William D. Blackman; Joseph P. Carrier

(57) ABSTRACT

A device for feeding fuel from a fuel tank (33) to a multi-fuel engine (12) that uses fuel in which alcohol and gasoline are mixed in an arbitrary ratio. The internal volume of a connecting line (84) provided between a fuel pressure governor (85) and a fuel injection device (50) is a volume equal to or greater than the amount of fuel consumed from startup of the engine until an oxygen sensor (88) reaches a measurement-enabling temperature.

18 Claims, 11 Drawing Sheets

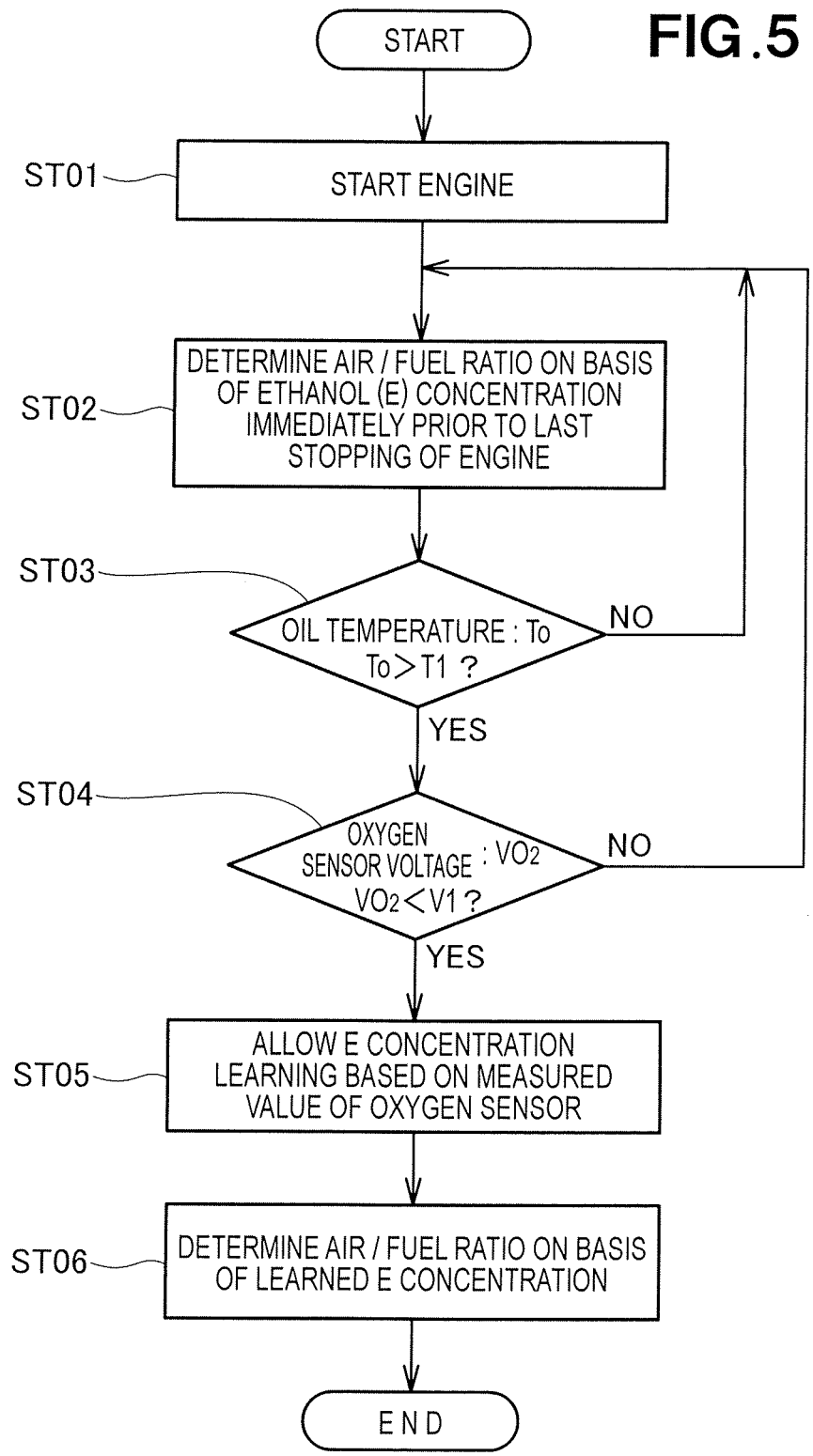

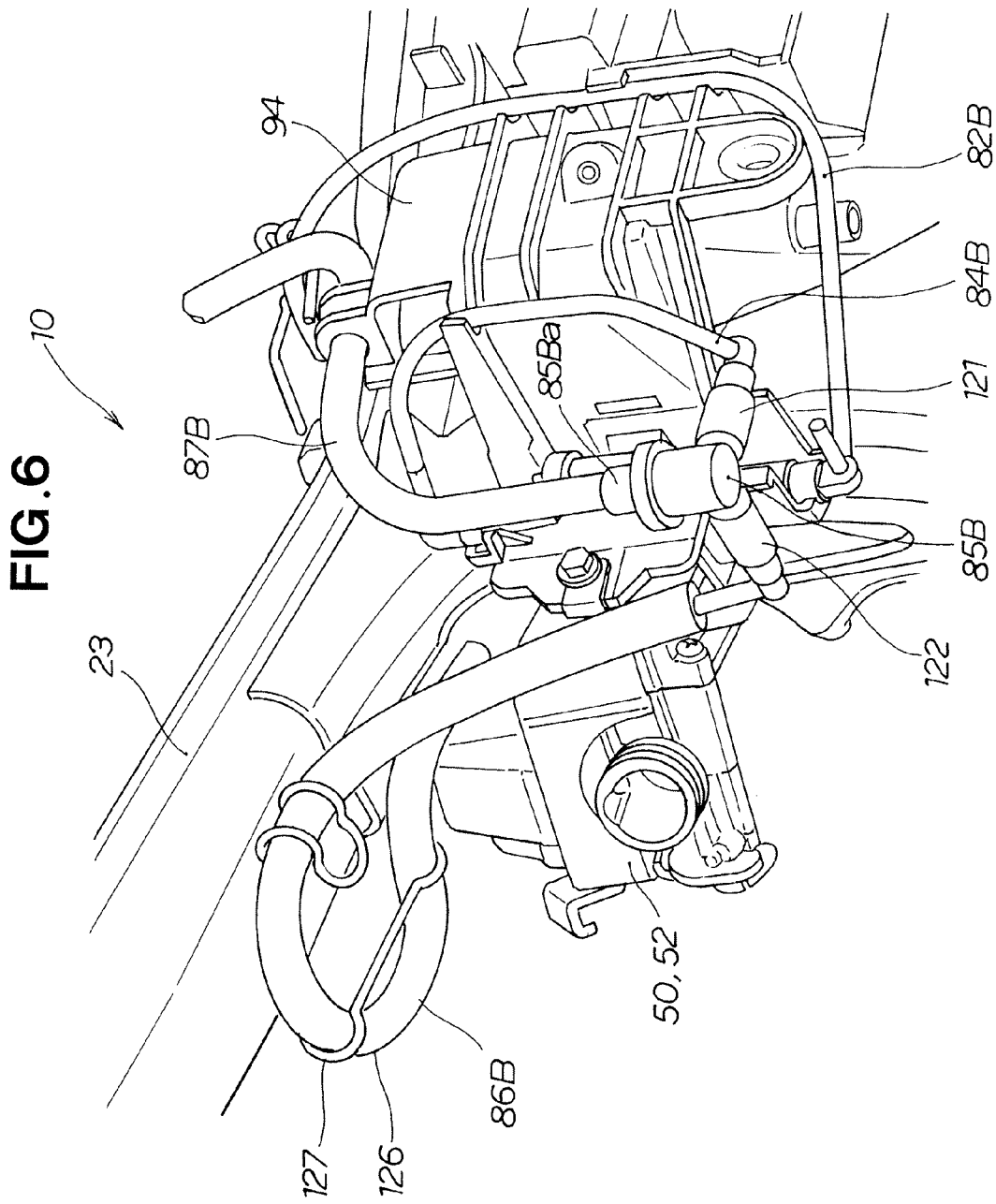

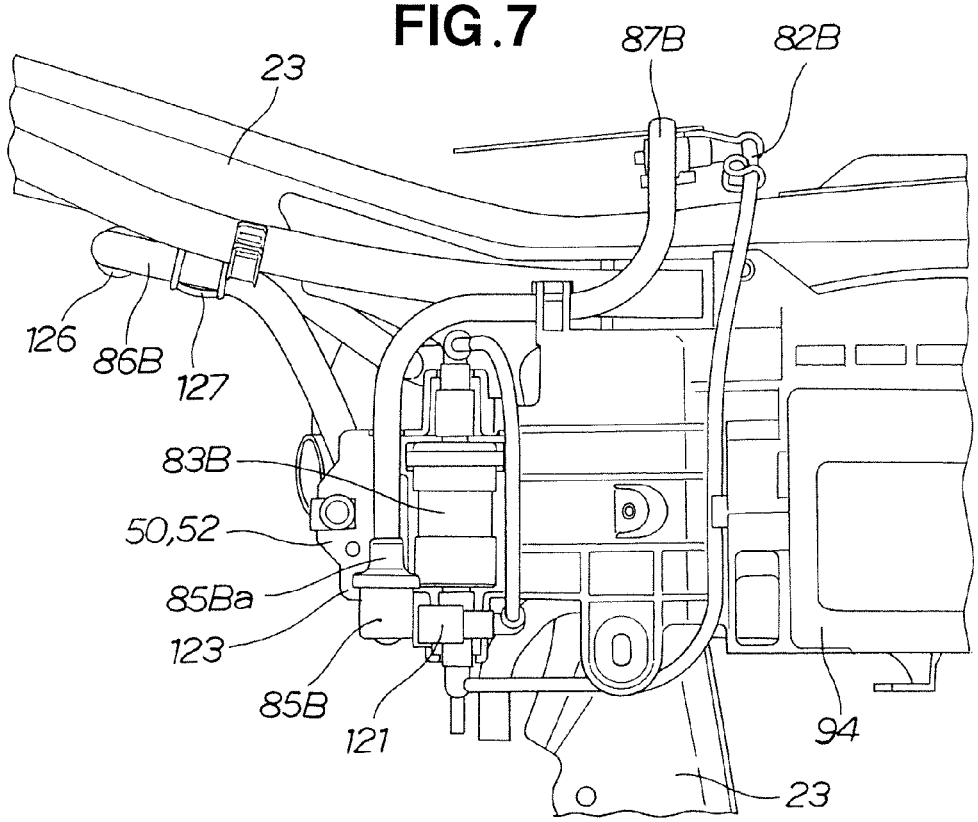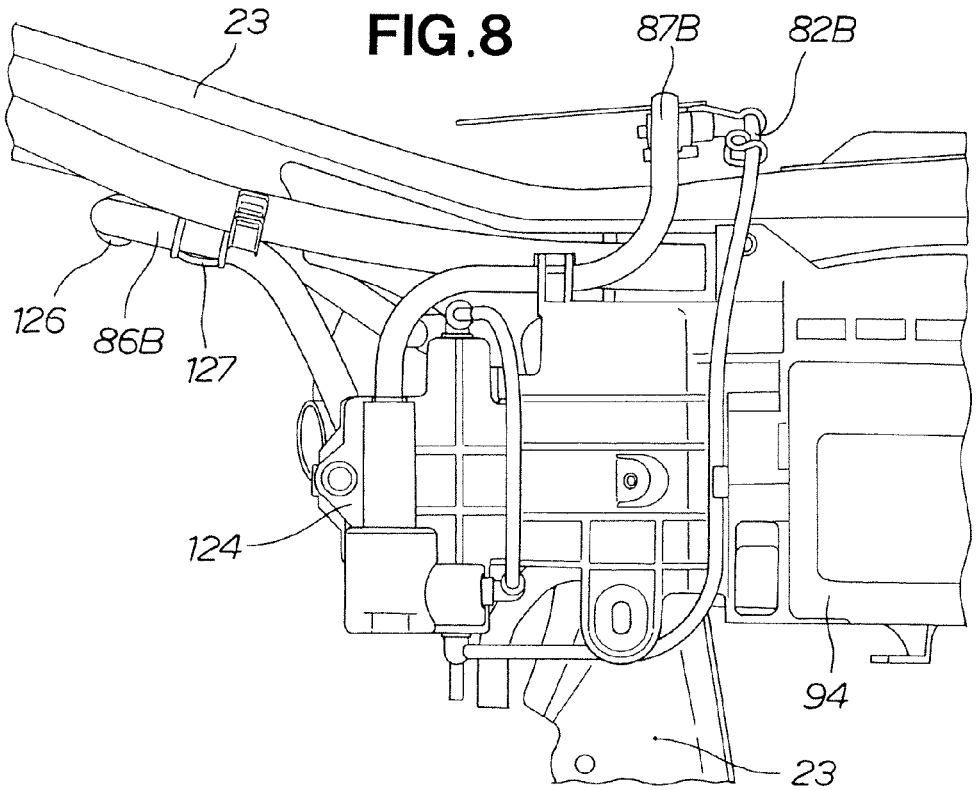

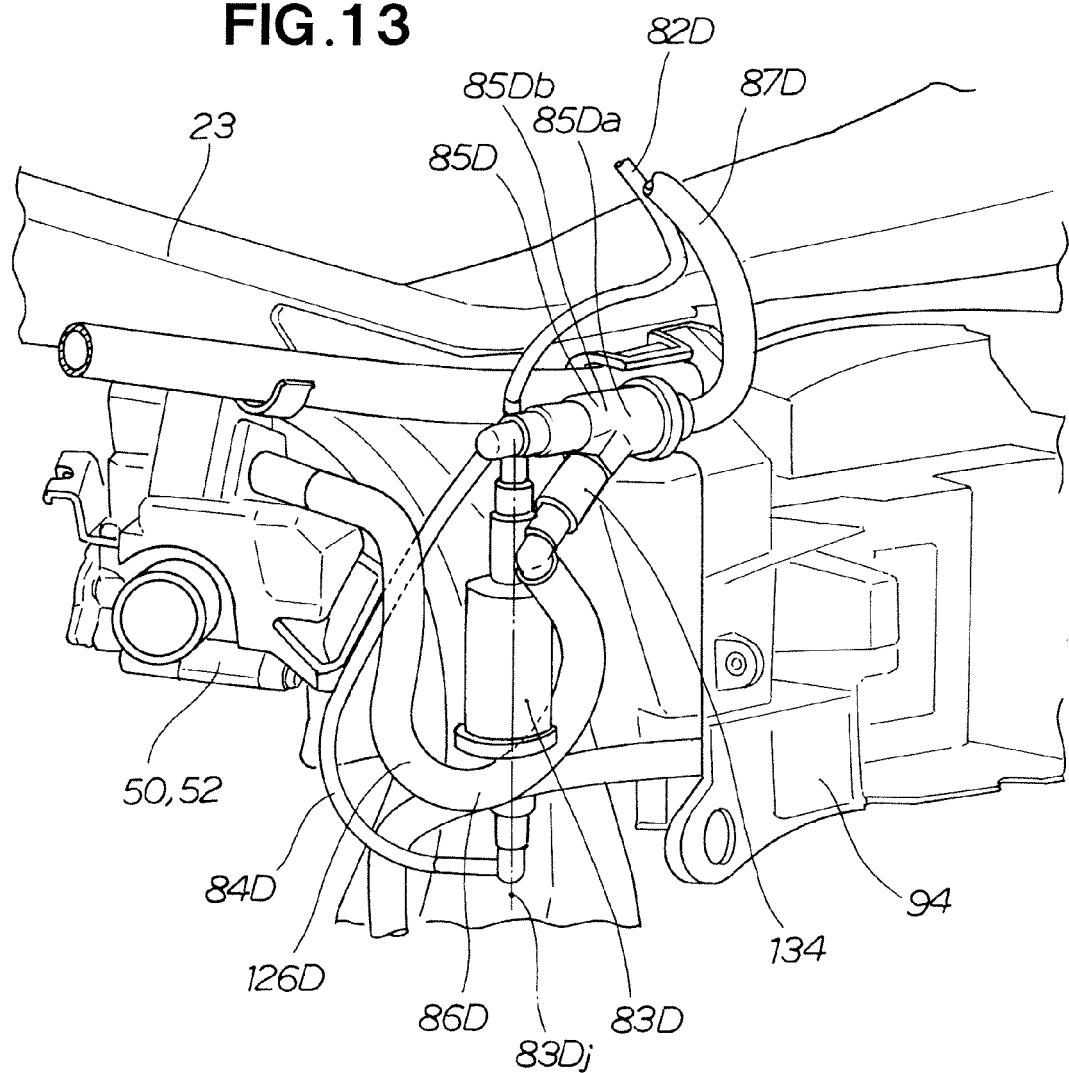

FUEL SUPPLY DEVICE

TECHNICAL FIELD

The present invention relates to a device for feeding optimal fuel to a multi-fuel engine that operates using an alcohol/gasoline mixture.

BACKGROUND ART

Methods are known for controlling the air/fuel ratio of an engine in accordance with the mixing ratio of alcohol in the fuel in a multi-fuel engine that operates using an alcohol/gasoline mixture, as disclosed in JP-S63-5131-A.

The engine described above is provided with an air intake duct for drawing in outside air, an injector provided in the air intake duct for injecting fuel, an exhaust duct through which exhaust gas passes, and an oxygen concentration sensor (hereinafter referred to as an "oxygen sensor") for measuring the concentration of oxygen in the exhaust gas, the oxygen sensor being provided in the exhaust duct. A microcomputer computes the optimum air/fuel ratio according to the concentration of oxygen in the exhaust gas, and controls the engine. Specifically, when alcohol is mixed in with the fuel, an air/fuel ratio that conforms to the alcohol mixing ratio is automatically set, and the engine is controlled to a preferred state by feeding back and correcting the air/fuel ratio according to operating conditions.

In the technique described above, zirconia is used in the oxygen sensor, and when the oxygen sensor that uses zirconia reaches a temperature equal to or above a predetermined temperature, the oxygen concentration is measured with a predetermined accuracy of detection. In other words, the predetermined accuracy of detection cannot be obtained by the zirconia before the oxygen sensor has reached a predetermined temperature.

Fuel is usually refilled while the engine is stopped. In a vehicle provided with a multi-fuel engine, the person doing the refueling can freely choose to refill any amount of a particular type of fuel during refueling. The newly filled fuel therefore mixes with the remaining fuel in the fuel tank, and the mixing ratio is not easily detected.

Even when ethanol or gasoline has been refilled while the engine is stopped, the mixing ratio of the fuel that remains in the fuel duct is still the same as the mixing ratio prior to refueling. Therefore, when the engine is to be started, it is efficient to use a method in which the startup is controlled using a reference fuel injection rate map that was used immediately prior to the last engine stoppage.

Since the ethanol concentration can be detected based on learning control or the like of the ethanol concentration using the measured value of the oxygen sensor once the oxygen sensor reaches a predetermined temperature during consumption of the fuel that remains in the fuel duct, the fuel remaining in the fuel duct is consumed, a transition is made to the new fuel having a different ethanol concentration, and the engine is gradually transferred to a control procedure in which fuel is injected at an air/fuel ratio commensurate with the new ethanol concentration even when there are abrupt changes in the ethanol concentration.

In a cold start, however, the engine consumes the fuel remaining in the fuel duct and is switched to the newly filled fuel having an unknown mixing ratio before control is started by detection of the ethanol concentration, and a state can occur in which the air/fuel ratio cannot be coordinated with the new target ethanol concentration if the reference fuel injection rate map used is the one used immediately before engine stoppage. When the predetermined detection accuracy is not obtained, problems occur in that it is difficult to combust fuel at the preferred air/fuel ratio in the engine.

DISCLOSURE OF THE INVENTION

An object of the present invention is to provide a fuel feeding device whereby fuel can be combusted at the preferred air/fuel ratio during cold starting of a multi-fuel engine.

According to a first aspect of the present invention, there is provided a device for feeding fuel from a fuel tank to a multi-fuel engine operated by using fuel in which alcohol and gasoline are mixed at an arbitrary ratio, the fuel feeding device comprising: a fuel pressure governor for maintaining the fuel from the fuel tank at a constant pressure; a fuel injection device for injecting the fuel to the engine; a connecting line for connecting the fuel pressure governor and the fuel injection device; an oxygen sensor for measuring an amount of oxygen included in exhaust gas of the engine; and a control unit for estimating the concentration of the alcohol on the basis of the measured value of the oxygen sensor and controlling the fuel injection rate; wherein the internal volume of the connecting line is a volume equal to or greater than the amount of fuel consumed from startup of the engine until the oxygen sensor reaches the measurement-enabling temperature.

Combustion occurs in the engine, the fuel remaining in the connecting line is consumed, the oxygen sensor is warmed by exhaust gas discharged through the use of the fuel, and the oxygen sensor heats up to the measurement-enabling temperature with a predetermined accuracy by the time the fuel remaining in the connecting line is consumed.

The oxygen sensor heats up to the measurement-enabling temperature by the time the fuel remaining in the connecting line is consumed. For example, during a so-called cold start, in which fuel having a different mixing ratio of gasoline and alcohol is filled into the fuel tank, and the engine is started when the engine has cooled to the outside temperature, the oxygen sensor and the control unit control the fuel feeding device, which includes a fuel injection device, on the basis of the mixing ratio of the remaining fuel in the connecting line that was filled prior to the change in the mixing ratio.

When the oxygen sensor has warmed up to the measurement-enabling temperature, the control unit detects the exhaust gas generated by combustion of the fuel whose mixing ratio has changed after filling, and controls the fuel feeding device accordingly.

When the vehicle is provided with a multi-fuel engine operated using a mixed ethanol-gasoline fuel, there is sometimes variation in the mixing ratio of the ethanol in the fuel introduced into the fuel tank by refueling. The fuel injection device is then capable of operating immediately after a cold start at a preferred air/fuel ratio, which is set in advance based of the fuel filled in the previous refueling.

Therefore, the present invention makes it possible for combustion to occur at the preferred air/fuel ratio in a multi-fuel engine in the case of a cold start when the mixing ratio of ethanol in the fuel stored in the fuel tank has changed due to refueling.

Preferably, the fuel feeding device is mounted to a vehicle, and the vehicle comprises a vehicle body frame; a fuel tank attached to the vehicle body frame; a fuel pump for pumping fuel to the engine, the fuel pump being provided to the fuel tank; and a fuel filter for filtering the fuel, the fuel filter being provided between the fuel pump and the fuel pressure governor. When the fuel feeding device is mounted to a vehicle, combustion at the preferred air/fuel ratio can be performed in the engine when the engine is cold-started, even when fuel having a different mixing ratio of ethanol is filled into the fuel tank.

The connecting line preferably has a U-shaped curve disposed partway in the connecting line. The connecting line can therefore be provided more compactly in the vehicle while maintaining a predetermined fuel volume, compared to a case in which a U-shaped curve is not provided. Providing the U-shaped curve compactly in the vehicle makes it possible to reduce the amount of space required by the connecting line.

Preferably, the fuel pressure governor is provided so that a longitudinal shaft thereof is in the vertical direction; an entry port to which the connecting line is connected, the entry port being provided to the fuel injection device, is provided above the fuel pressure governor; and the U-shaped curve is provided between the entry port and a fuel exit port provided to the fuel pressure governor. Providing the fuel exit port of the fuel pressure governor so as to face downward in the longitudinal shaft direction, and providing a return exit port for discharging excess fuel so as to face upward in the longitudinal shaft direction enables air bubbles mixed in or occurring in the fuel to easily escape upward from the return exit port. When air bubbles included in the fuel can easily escape, the air bleed efficiency of the fuel pressure governor can be increased. Increased air bleed efficiency makes it possible to reduce the amount of air bubbles that are included in the fuel outputted from the fuel exit port to the engine. Reducing the amount of air bubbles included in the fuel makes it possible for combustion to occur satisfactorily in an internal combustion engine.

The connecting line preferably has a coiled part disposed partway in the connecting line. A connecting line that includes a coiled part can therefore be provided more compactly in the vehicle while maintaining a predetermined fuel volume, compared to a case in which a coiled part is not provided. Providing the connecting line compactly in the vehicle makes it possible to reduce the amount of space required by the connecting line.

The coiled part is preferably provided between the vehicle body frame and the fuel injection device. Dead space in the vehicle can therefore be put to use, and the connecting line can be provided even more compactly.

The connecting line preferably has a folded duct part that is folded so that a flow path leads back and forth partway in the connecting line. The fuel volume can thus be increased while the connecting line is made compact. Increasing the fuel volume makes it possible for a predetermined volume of fuel to easily be stored in the connecting line.

The connecting line is preferably provided with a case having a labyrinth passage, the case being interposed partway in the line. The connecting line can thus be endowed with the necessary volume without the mixing of the fuel before or after filling, even when a folded duct part cannot be provided.

Preferably, the fuel injection device is provided below the fuel tank, the fuel pressure governor is provided behind the fuel tank and below a vehicle occupant seat on which a vehicle occupant sits, and the connecting line is provided so as to extend forward from the vehicle occupant seat in a longitudinal direction of the vehicle body frame. Maintenance of the fuel pressure governor can therefore easily be performed when the vehicle occupant seat is opened. Since the connecting line is provided so as to extend in the front and rear direction, an adequate duct length can be maintained. When an adequate duct length is maintained, it is easy to obtain the fuel volume that is necessary for the oxygen sensor to warm up to the measurement-enabling temperature.

BRIEF DESCRIPTION OF THE DRAWINGS

FIG. 5 is a flow diagram of the control unit of FIG. 2, showing steps whereby the engine learns the ethanol concentration and determines a predetermined air/fuel ratio during a cold start;

FIG. 6 is a perspective view showing the connecting line and surrounding area thereof according to a second embodiment of the present invention;

FIG. 7 is a side view showing, with the filter cover removed, the connecting line and surrounding area thereof shown in FIG. 6;

FIG. 8 is a side view showing the connecting line and surrounding area thereof shown in FIG. 7, with the filter cover attached;

FIG. 13 is a perspective view showing the connecting line and surrounding area thereof according to a fourth embodiment of the present invention.

Figure 1:
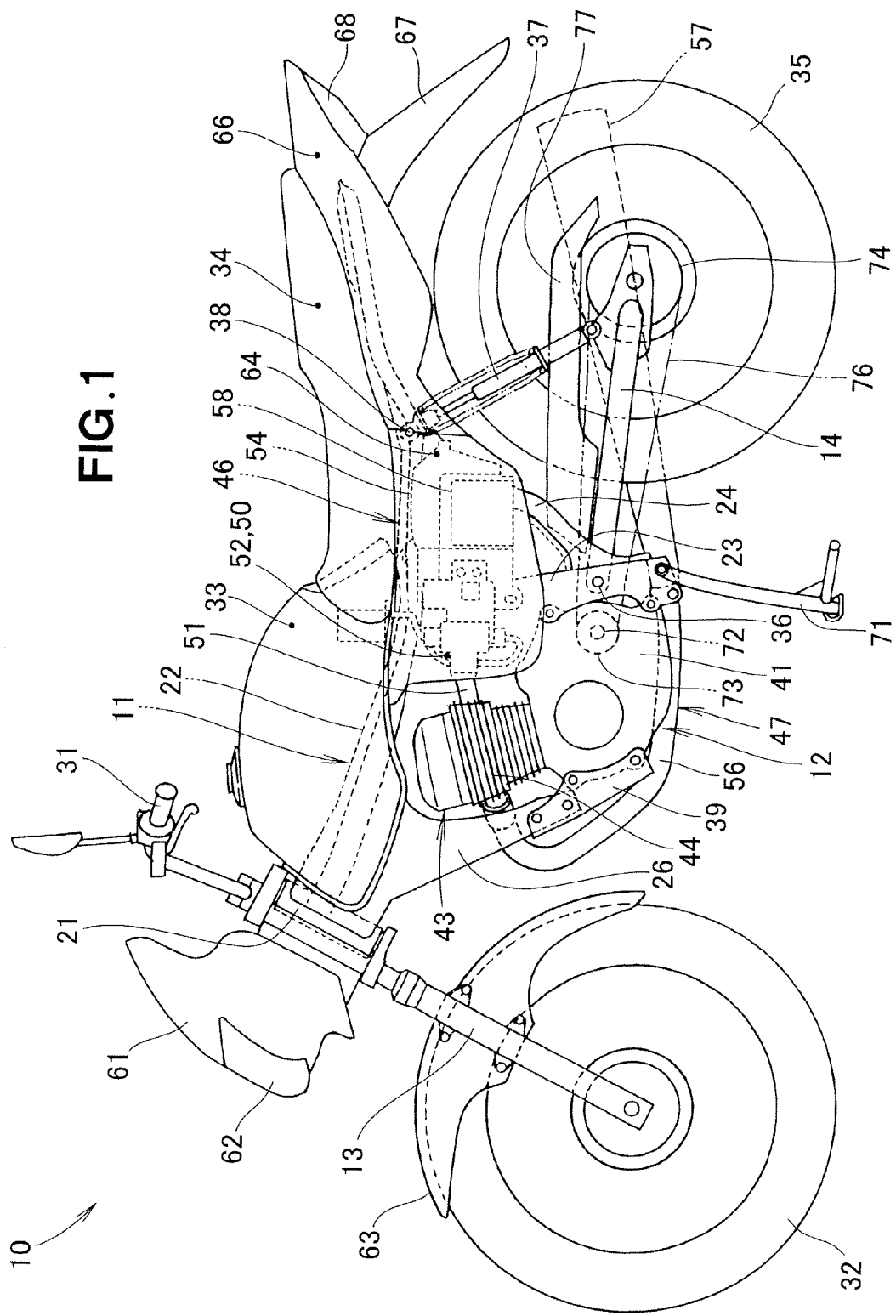
FIG. 1 is a left-side view showing a vehicle provided with the fuel feeding device according to a first embodiment of the present invention.

DESCRIPTION OF REFERENCE SYMBOLS 11 vehicle body frame
15 internal combustion engine
33 fuel tank
34 vehicle occupant seat
50 fuel injection device
80 fuel feeding device
81 fuel pump
83 fuel filter
85 fuel pressure governor
86 connecting line
88 oxygen sensor
89 control unit
111 U-shaped curve
131 labyrinth passage
132 case

BEST MODE FOR CARRYING OUT THE INVENTION

Certain preferred embodiments of the present invention are described below, by way of example, with reference to the accompanying drawings.

The vehicle 10 shown in FIG. 1 is a motorcycle in which an engine (internal combustion engine) 12 is provided in the center of a vehicle body frame 11, a front fork 13 is supported by the front end of the vehicle body frame 11 so as to be capable of steering, and a rear fork 14 is supported by the rear lower part of the vehicle body frame 11 so as to be able to swing up and down. Ethanol, gasoline, or a mixture of gasoline and ethanol is used as the main fuel, and gasoline or a mixture of gasoline and ethanol (wherein the mixing ratio of gasoline is higher than in the main fuel mixture) is used as a secondary fuel only at engine startup, e.g., when the temperature is low and the starting properties of the engine are poor.

The vehicle body frame 11 is a frame member in which a plurality of press-molded components is joined, and is composed of a head pipe 21 provided to the front end, a main frame 22 that extends to the rear from the head pipe 21, a center frame 23 that extends downward from the middle of the main frame 22, a sub frame 24 that is connected to the rear part of the main frame 22 and the lower part of the center frame 23, and a down frame 26 that extends at an angle downward and to the rear from the head pipe 21.

The head pipe 21 is a portion to which the front fork 13 is rotatably attached, and a handlebar 31 and a front wheel 32 are attached to the top and bottom, respectively, of the front fork 13. A fuel tank 33 for storing the main fuel is attached to the main frame 22 so as to extend over the front part thereof. A vehicle occupant seat 34 is attached to the rear part of the main frame 22.

The center frame 23 supports the down frame 26 as well as the engine 12. The rear fork 14 swings about a pivot shaft 36 provided to the center frame 23. A rear wheel 35 is attached at the rear end of the rear fork 14.

A rear cushion unit 37 is attached so as to extend between the rear part of the rear fork 14 and the rear part of the main frame 22. The reference numeral 38 refers to an attachment shaft for attaching the upper end part of the rear cushion unit 37, and the attachment shaft is provided to the main frame 22.

The down frame 26 supports the engine 12 via a bracket 39.

The engine 12 is attached to the vehicle body frame 11, a transmission 41 is provided to the rear part of the engine 12, a cylinder head 44 is provided to a cylinder part 43 that extends upward, an air intake device 46 is connected to the rear part of the cylinder head 44, and an exhaust device 47 is connected to the front part of the cylinder head 44.

Figure 2:
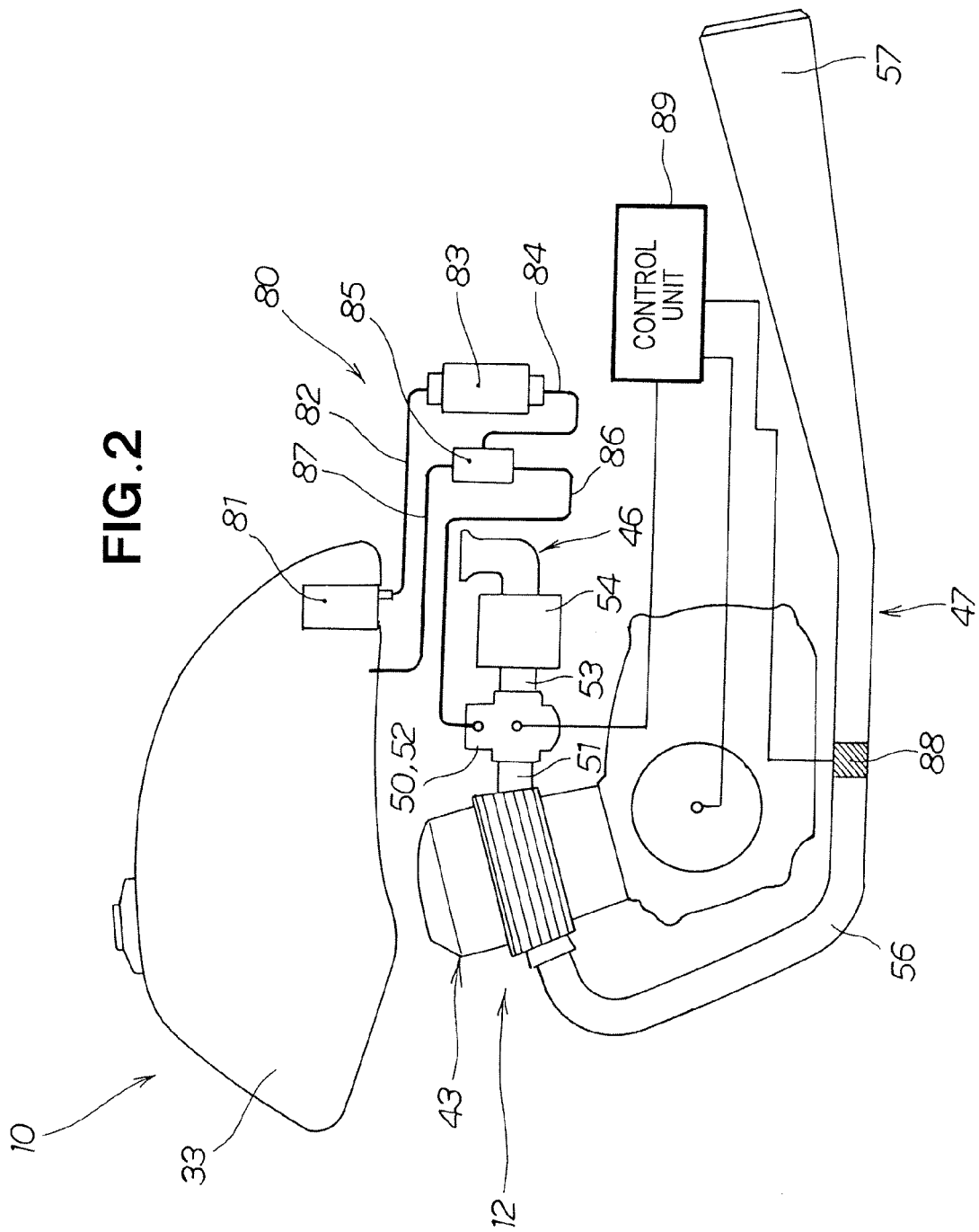
FIG. 2 is a schematic view of the fuel feeding device shown in FIG. 1.

The air intake device 46 is composed of an air intake duct 51 connected at one end to the cylinder head 44; a throttle body 52 in which a fuel injection device 50 is housed, one end of the throttle body being connected to the other end of the intake duct 51; and an air cleaner 54 connected to the other end of the throttle body 52 via a connecting tube 53 (see FIG. 2).

The exhaust device 47 is composed of an exhaust duct 56 that extends downward and to the rear from in front of the engine 12, one end of the exhaust duct 56 being connected to the front part of the cylinder head 44; and a muffler 57 extended to the rear and connected to the other end of the exhaust duct 56.

In the diagrams, the reference numeral 58 refers to a battery, 61 to a front cowl, 62 to a headlamp, 63 to a front fender, 64 to a side cover for covering the side of the air cleaner 54, 66 to a rear side cover, 67 to a rear fender, 68 to a tail lamp, 71 to a main stand, 72 to the output shaft of the transmission 41, 73 to a drive sprocket attached to the output shaft 72, 74 to a driven sprocket attached to the rear wheel 35, 76 to a chain hung on the drive sprocket 73 and the driven sprocket 74, and 77 to a chain cover.

FIG. 2 shows the fuel feeding device 80 of the engine provided to the motorcycle 10.

The motorcycle 10 is provided with the fuel feeding device 80 for feeding fuel to the engine 12 that uses multiple types of fuel, and the fuel tank 33 for storing the fuel, the fuel tank 33 being connected to the fuel feeding device 80.

The fuel feeding device 80 is provided with a fuel pump 81 for pumping the fuel, the fuel pump 81 being provided inside the fuel tank 33; a feed duct 82 that extends from the fuel pump 81 to a fuel filter 83; the fuel filter 83 for filtering the fuel, the fuel filter 83 being connected to an end of the feed duct 82; a fuel hose 84 that extends from the fuel filter 83 to a fuel pressure governor 85; the fuel pressure governor 85 for maintaining the fuel at a constant pressure, the fuel pressure governor 85 being connected to an end of the fuel hose 84; a rubber connecting line 86 extended from one end of the fuel pressure governor 85 to the fuel injection device 50 and connected to a throttle body 52 that forms a constituent element of the fuel injection device 50 for spraying fuel into air; a return hose 87 that extends from the other end of the fuel pressure governor 85 to the fuel tank 33; an oxygen sensor 88 for measuring the amount of oxygen included in the exhaust gas of the engine 12 in order to control the air/fuel ratio, the oxygen sensor 88 being provided inside an exhaust duct 56; and a control unit 89 for controlling the fuel injection device 50 so that the air mixture fed to the engine 12 has a predetermined air/fuel ratio, the control unit 89 being connected to the oxygen sensor 88.

Since the connecting line 86 is made of rubber, pulsation can be suppressed even in the case of ethanol, in which the fuel injection rate is relatively high.

Figure 3:
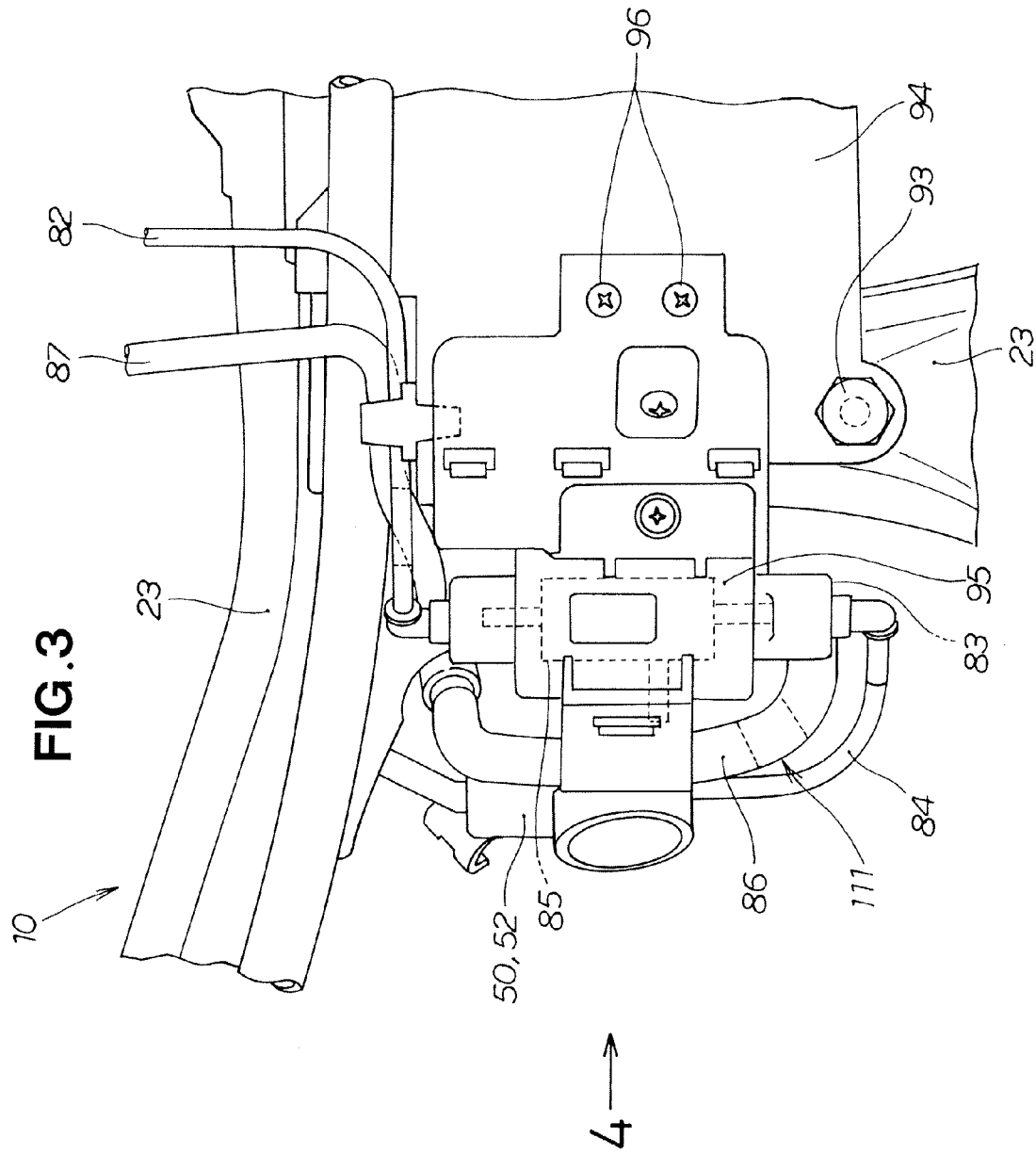
FIG. 3 is a detailed view of the fuel feeding device shown in FIG. 1.
Figure 4:
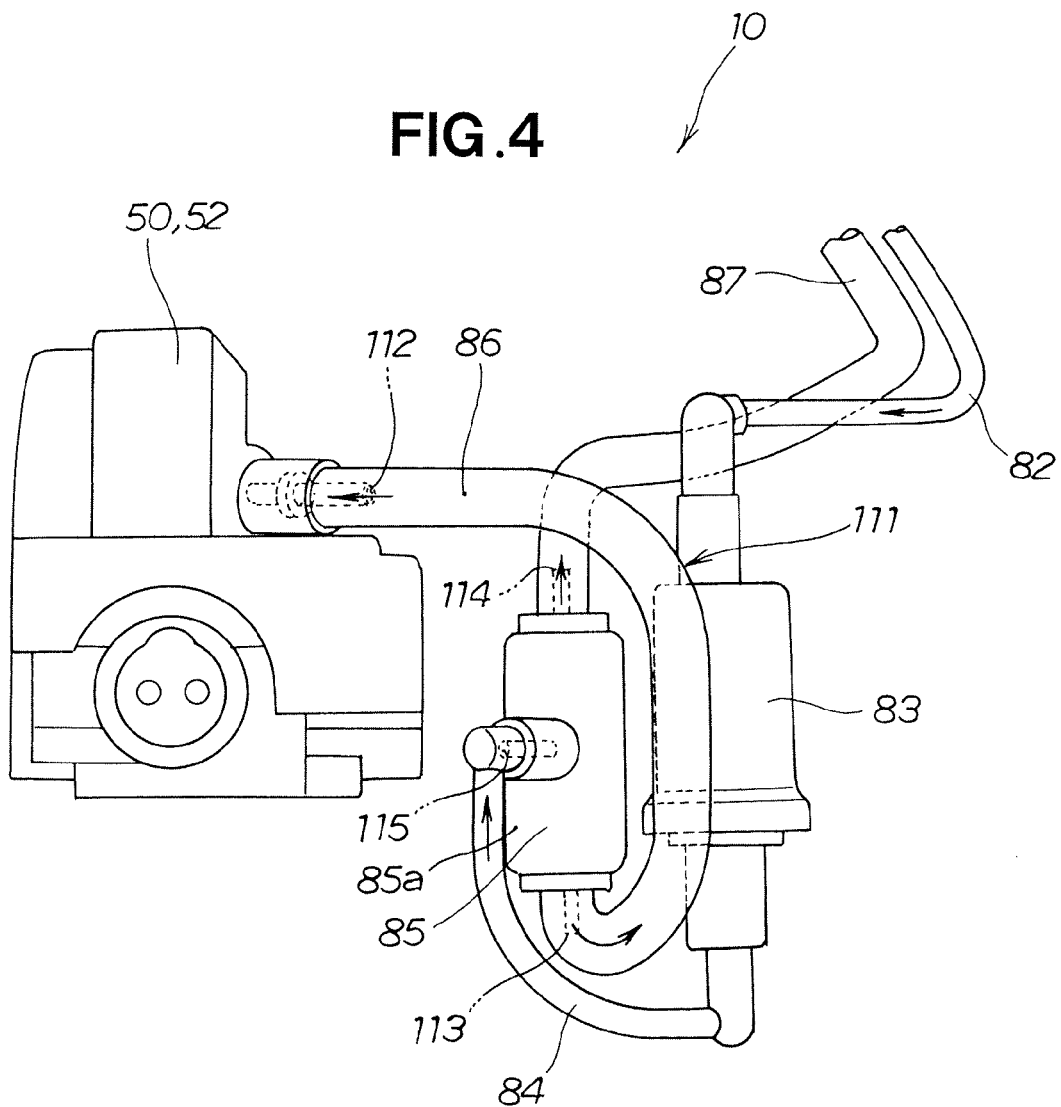
FIG. 4 is a view in the direction of arrow 4 of FIG. 3, showing a state in which the connecting line is curved in a U shape.

As shown in FIGS. 3 and 4, a battery box 94 in which a battery is housed is attached by a bolt 93 to a side of the center frame 23 provided substantially in the center of the vehicle 10, a filter cover 95 is attached by screws 96 to the front of the battery box 94, and the fuel filter 83 is housed in the filter cover 95. In other words, the filter cover 95 for covering and supporting the fuel filter 83 is provided around the fuel filter 83.

As viewed from the left side of the motorcycle 10, the fuel pressure governor 85 is provided behind the fuel filter 83 and toward the center in the width direction of the vehicle, and the throttle body 52 (which includes the fuel injection device 50) is provided closer to the center in the width direction of the vehicle than the fuel pressure governor 85. In other words, the fuel pressure governor 85 is provided further to the inside than the filter cover 95 and so as to overlap the filter cover 95 when the motorcycle 10 is viewed from the side.

The operation of the above-described vehicle provided with a multi-fuel internal combustion engine capable of using multiple types of fuel will next be described. The term "cold start" refers to a case in which the engine 12 is started at the same temperature as the outside air temperature, and the temperature of the oxygen sensor 88 provided to the exhaust duct 56 has not reached 300° C.

The process flow whereby the ethanol concentration in the fuel stored in the fuel tank is learned, and a predetermined air/fuel ratio is set during a cold start of the internal combustion engine will be described hereinafter based on FIGS. 2 through 4.

As shown in FIG. 5, the engine 12 is started in step (hereinafter abbreviated as ST) 01, and the air/fuel ratio is determined based on the ethanol temperature (E concentration) immediately prior to the last stopping of the engine 12 (ST02).

In ST03, the oil temperature (To) of the oil circulated in the engine 12 is measured, the process waits until To is above a temperature setting T1, and the process proceeds to ST04 when a determination is made that To is above the setting T1.

There is a positive correlation between the oil temperature (To) and the temperature of the oxygen sensor 88, and the temperature of the oxygen sensor 88 increases as the oil temperature increases. When To=T1, the temperature of the oxygen sensor 88 is assumed to have reached 300° C.

In ST04, the voltage (VO$_2$) of the oxygen sensor 88 is measured, the process waits until the value of VO$_2$ is smaller than a voltage setting V1, and the process proceeds to ST05 when a determination is made that VO$_2$ is less than V1.

In ST05, since the temperature of the oxygen sensor 88 has reached 300° C. or above, and a predetermined detection accuracy is ensured in the oxygen sensor 88, learning of the ethanol concentration on the basis of the measured value of the oxygen sensor is allowed, and the process proceeds to ST06.

A new air/fuel ratio is determined based on the ethanol concentration learned in ST06.

The degree of opening of the fuel injection device 50, the degree of opening of the throttle body 52, and other elements are controlled by the control unit 89 on the basis of the voltage value detected by the oxygen sensor 88, and the air/fuel ratio after the start of learning is thereby controlled to a predetermined value.

A single cycle from the cold start of the engine 12 until the functioning of the control unit 89 and an issue of a command for setting the air/fuel ratio is thereby completed.

The oil temperature is measured in ST03 in the present embodiment, but water temperature may also be measured in the case of a water-cooled engine. The temperature of the exhaust gas may also be measured directly.

In the present embodiment, since time is required until learning is allowed based on the measured value of the oxygen sensor 88 in ST05, i.e., until the temperature of the oxygen sensor 88 increases to 300° C. or higher after a cold start, the connecting line 86 between the fuel injection device 50 and the fuel pressure governor 85 is configured so that the volume thereof is the same or greater than a volume of an amount of fuel estimated to be sufficient to supply the engine 12 during a warm-up period lasting from an initial cold startup of the engine until the oxygen sensor 88 reaches the measurement-enabling temperature under a set of predetermined operating conditions.

The connecting line 86 of the fuel ducts is given a predetermined volume for the reason described below.

When the engine 12 is started, the fuel pump 81 provided to the fuel tank 33 is actuated first. Fuel is not yet injected from the fuel injection device 50 at this time. Since no fuel is injected, the fuel pumped through the fuel hose 84 by the fuel pump 81 enters the return pipe 87 without entering the connecting line 86 provided first in sequence from the fuel pressure governor 85, and returns to the fuel tank 33. The volume of the connecting line 86 for connecting between the fuel pressure governor 85 and the fuel injection device 50 must therefore be equal to or greater than a predetermined volume.

As shown in FIGS. 3 and 4, a U-shaped curve 111 is provided to the connecting line 86, and the internal volume of the connecting line 86 is maintained at or above a predetermined value in the U-shaped curve 111.

Because the U-shaped curve 111 is provided to the connecting line 86, the connecting line 86 can be provided compactly in the vehicle 10 while maintaining a predetermined fuel volume, compared to a case in which the U-shaped curve 111 is not provided. Providing the U-shaped curve 111 compactly in the motorcycle 10 makes it possible to reduce the amount of space required to provide the U-shaped curve 111.

The fuel pressure governor 85 is provided so that the longitudinal shaft 85a thereof is in the vertical direction. An entry port 112 provided to the fuel injection device 50, and connected to the connecting line 86 is provided above the fuel pressure governor 85. The U-shaped curve 111 is provided between a fuel exit port 113 provided to the fuel pressure governor 85, and the entry port 112 provided to the fuel injection device 50.

According to FIG. 2 as well, the fuel exit port 113 provided to the fuel pressure governor 85 is disposed facing downward in the direction of the longitudinal shaft 85a, and a return exit port 114 for discharging excess fuel is provided facing upward in the direction of the longitudinal shaft 85a. Air bubbles mixed in or occurring in the fuel thereby easily escape upward from the return exit port 114. When air bubbles can easily escape, the air bleed efficiency of the fuel pressure governor 85 can be increased. Increased air bleed efficiency makes it possible to reduce the amount of air bubbles outputted from the fuel exit port 113. Reducing the amount of air bubbles included in the fuel makes it possible for combustion to occur satisfactorily in the engine 12.

The volume of the connecting line 86 is a volume equal to or greater than the amount of fuel consumed from startup of the engine 12 until the oxygen sensor 88 reaches the measurement-enabling temperature.

For example, in the case of a cold start following the filling of a fuel having a different ethanol mixing ratio than the previously filled fuel, the oxygen sensor 88 heats up to the measurement-enabling temperature with a predetermined accuracy by the time the fuel remaining in the connecting line 86 is completely consumed. When the oxygen sensor 88 has reached the temperature at which the concentration of oxygen in the exhaust gas can be measured with a predetermined accuracy, the control unit 89 can then control the fuel injection device 50 on the basis of the signal of the oxygen sensor 88 so that the air mixture has the predetermined air/fuel ratio.

The engine is therefore operated at an air/fuel ratio set in advance in accordance with the portion of fuel previously filled even when one portion of the fuel stored in the fuel tank 33 has a different mixing ratio than the rest of the fuel, and after the oxygen sensor 88 has reached the temperature at which measurement with the predetermined accuracy is possible, the control unit 89 controls the fuel injection device 50 so that the predetermined air/fuel ratio is obtained.

In particular, since the fuel injection device 50 is operated at an air/fuel ratio set in advance in accordance with the previously filled portion of fuel immediately after startup, combustion can be stably performed by the engine 12. Even when there is a change in the mixing ratio of the fuel filled into the fuel tank 33, the fuel injection device 50 is operated at an air/fuel ratio set in advance in accordance with the previously filled portion of fuel immediately after startup, allowing optimal combustion to be obtained in the engine 12.

FIGS. 6 through 8 show the connecting line and surrounding area thereof according to a second embodiment. The second embodiment differs from the first embodiment with regard to the structure and placement of the fuel pressure governor 85B, the shape of the connecting line 86B, and other aspects. There are no other significant differences. The aspects that differ significantly from the first embodiment will be described with reference to FIGS. 6 through 8.

The fuel pressure governor 85B is composed of a vertically extending longitudinal shaft 85Ba to which a return hose 87B is connected; a first horizontal part 121 to which a fuel hose 84B is connected, the first horizontal part 121 extending to the rear from the bottom of the longitudinal shaft 85Ba; and a second horizontal part 122 to which the connecting line 86B is connected, the second horizontal part 122 extending inward from the bottom of the longitudinal shaft 85Ba.

A fuel filter 83B is provided so that the longitudinal axis thereof is in the vertical direction. The fuel pressure governor 85B is provided so that the longitudinal shaft 85Ba thereof is in the vertical direction. The fuel pressure governor 85B is provided toward the outside in the vehicle width direction with respect to the fuel filter 83B. A filter case 123 for supporting the fuel filter 83B is provided extending to the front of the battery box 94 so that the arrangement described above is created, and a cover member 124 is attached for covering the fuel filter 83B and holding down the fuel pressure governor 85B from the side of the filter case 123.

The connecting line 86B is a duct connected between the fuel pressure governor 85B and the throttle body 52 that includes the fuel injection device 50, and the connecting line 86B has a coiled part 126.

The coiled part 126 is supported by a stay 127 below the center frame 23. Since the coiled part 126 is provided between the vehicle body frame 11 and the fuel injection device 50, dead space in the vehicle 10 can be put to use, and the connecting line 86B can be provided even more compactly while the predetermined fuel volume is maintained.

The reference numeral 82B refers to a feed duct connected between the fuel filter 83B and the fuel pump 81 provided to the fuel tank 33 in the first embodiment.

Since the connecting line 86B has the coiled part 126, the connecting line 86B can be provided more compactly in the vehicle 10 while maintaining a predetermined fuel volume, compared to a case in which the coiled part 126 is not provided. Providing the connecting line 86B more compactly in the vehicle 10 makes it possible to reduce the amount of space required by the connecting line 86B in the vehicle 10.

The volume of the connecting line 86B is a volume equal to or greater than the amount of fuel consumed from startup of the engine 12 (FIG. 2) until the oxygen sensor 88 reaches the measurement-enabling temperature.

The reference numeral 82B in FIGS. 6 through 8 refers to a feed duct.

Figure 9:
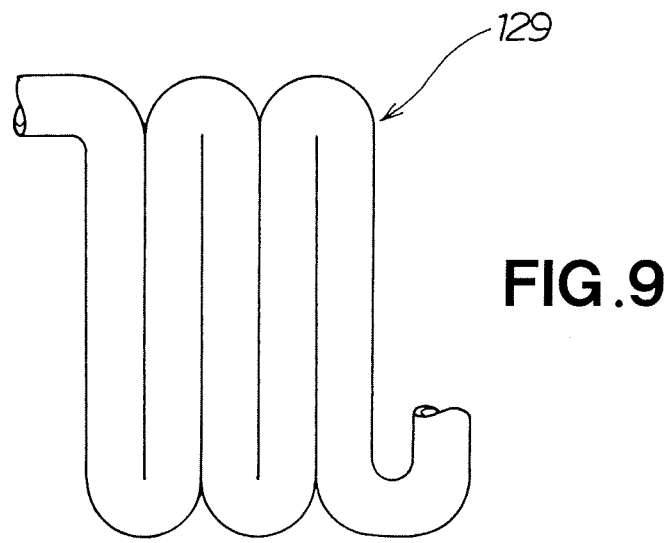
FIG. 9 is a view showing the folded duct part interposed in the connecting line.

FIG. 9 shows a folded duct part 129 interposed partway in the connecting line. The folded duct part 129 is interposed partway in the connecting line 86 (FIG. 2) and is folded so that the flow path leads back and forth.

When the folded duct part 129 that is folded so that the flow path leads back and forth is interposed in the connecting line 86, the length of the connecting line 86 can be reduced, and internal volume can be added to the duct while the connecting line 86 is compactly arranged. Adding volume makes it possible for a predetermined volume of fuel to easily be maintained in the connecting line 86.

Figure 10:
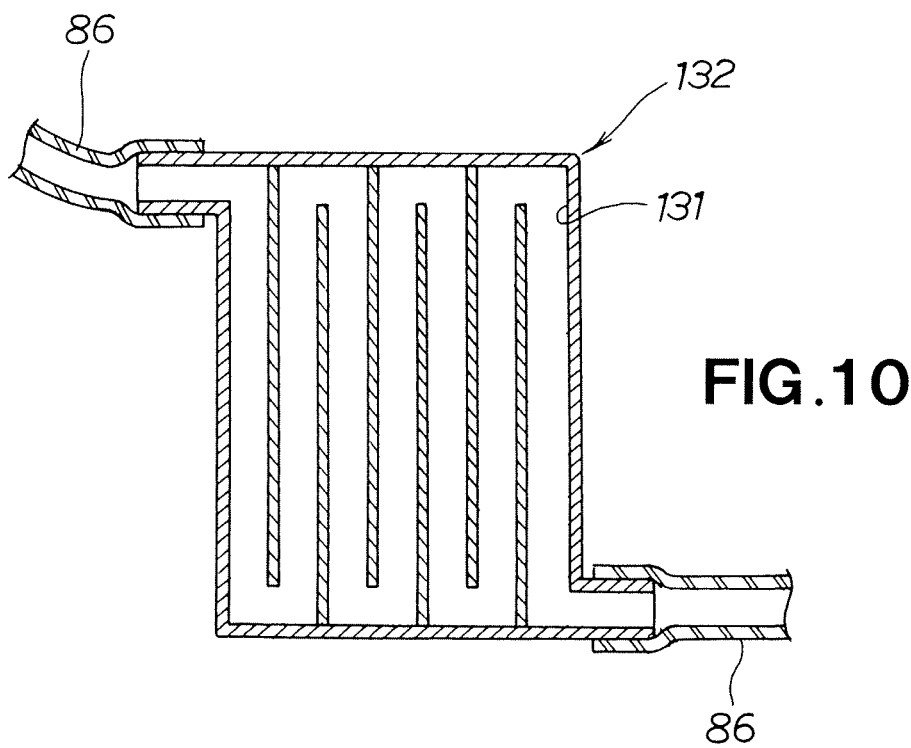
FIG. 10 is a view showing the case having a labyrinth passage by which the connecting line is interposed.

FIG. 10 shows a case 132 having a labyrinth passage 131 that is interposed in the connecting line 86. Each of the embodiments of FIGS. 9 and 10, respectively, illustrates a fuel feeding device in which a connecting line 86 includes a compressed flow path portion therein, in which a flow path includes a plurality of first segments in which fuel travels in a first direction, and a plurality of second segments in which fuel travels in a second direction which is substantially opposite to the first direction.

When the case 132 having a labyrinth passage 131 is interposed in the connecting line 86, the connecting line 86 can be endowed with the necessary volume without the mixing of the fuel before or after filling, even when the folded duct part 129 (FIG. 9) cannot be provided, for example.

Figure 11:
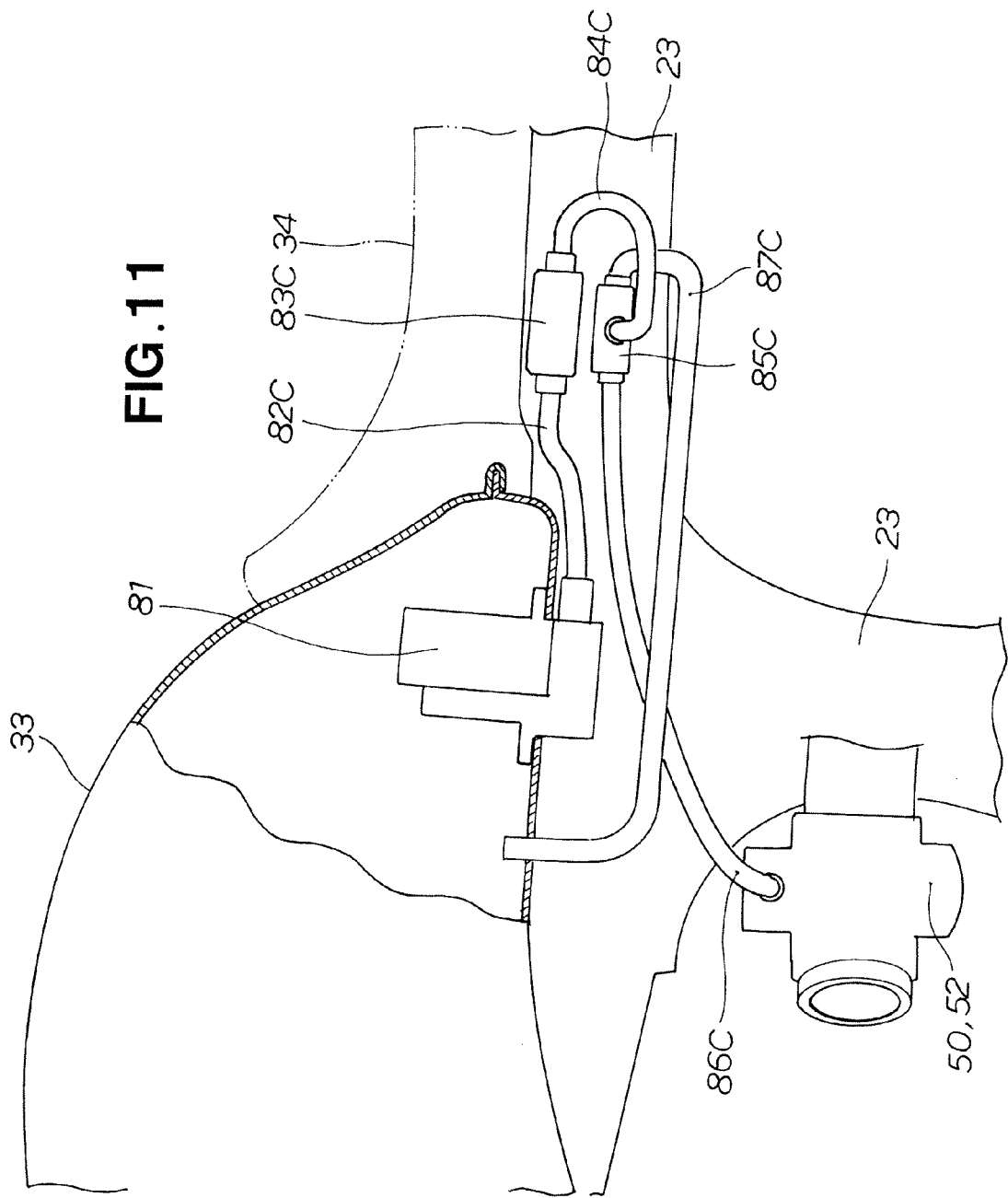
FIG. 11 is a side view showing the connecting line and surrounding area thereof according to a third embodiment of the present invention.
Figure 12:
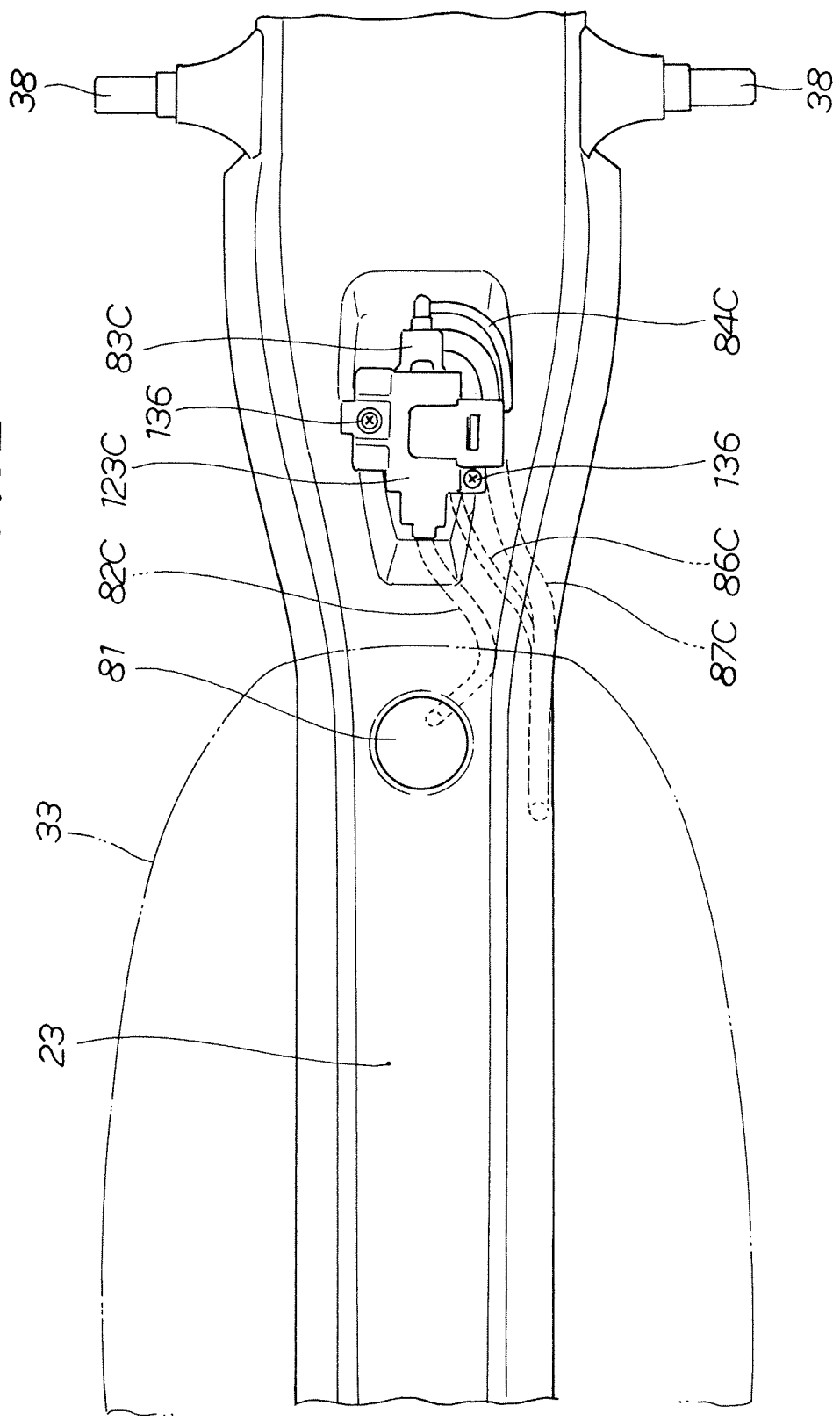
FIG. 12 is a plan view of FIG. 11.

FIGS. 11 and 12 show the connecting line and surrounding area thereof according to a third embodiment. The aspects of the third embodiment that significantly differ from the first and second embodiments will be described below.

The fuel tank 33 is provided above the center frame 23, the fuel injection device 50 included in the throttle body 52 is provided below the fuel tank 33, the vehicle occupant seat 34 on which a vehicle occupant sits is provided to the rear of the fuel tank 33, a fuel filter 83C is provided below the vehicle occupant seat 34, and a fuel pressure governor 85C is provided below the fuel filter 83C. A connecting line 86C for connecting the fuel pressure governor 85C and the fuel injection device 50 is provided so as to extend along the center frame 23 and to the front of the fuel tank 33. The reference numeral 123C refers to a filter case, and the reference numeral 136 refers to a screw for fixing the filter case 123C to the center frame 23.

Since the fuel filter 83C and the fuel pressure governor 85C are provided below the vehicle occupant seat 34, maintenance of the fuel filter 83C and fuel pressure governor 85C attached to the center frame 23 via the screw 136 and the filter case 123C can easily be performed when the vehicle occupant seat 34 is opened.

The connecting line 86C is connected to the fuel injection device 50 at a point in front of the vehicle occupant seat 34, and an adequate duct length can therefore be maintained. Internal volume can be added to the duct when adequate duct length is maintained. When internal volume is added to the duct, it is easy to ensure the fuel volume that is necessary for the oxygen sensor 88 (FIG. 2) to warm up to the measurement-enabling temperature.

In FIGS. 11 and 12, the reference numeral 82C refers to a feed duct, 84C refers to a fuel hose, and 87C refers to a return hose.

FIG. 13 shows the connecting line and surrounding area thereof according to a fourth embodiment.

The fourth embodiment differs from the first embodiment with regard to the structure of the fuel pressure governor 85D and the positional relationship between the fuel filter 83D and the fuel pressure governor 85D, and there are no other significant differences.

In the fuel pressure governor 85D, a fuel hose 84D is connected to the front end part of a horizontally extending shaft part 85Da, a return pipe 87D is connected to the rear end part of the shaft part 85Da, and the fuel pressure governor 85D has a forward-extending part 134 which extends at an angle downward and to the front from a side surface 85Db of the shaft part 85Da and in which a connecting line 86D is connected to the forward-extending part 134.

The fuel filter 83D is provided so that the axis 83Dj extends in the vertical direction, and the fuel pressure governor 85D is provided toward the outside in the vehicle width direction with respect to the fuel filter 83D.

A coiled part 126D is provided to the connecting line 86D. Providing the coiled part 126D enables a predetermined fuel volume to be maintained.

The reference numeral 82D in FIG. 13 refers to a feed duct.

The means provided to the connecting line in order to maintain a fuel volume is not limited to a U-shaped curve, and means other than a U-shaped curve may be provided.

The fuel pressure governor may be provided so that the longitudinal axis thereof is in a direction other than the vertical direction. For example, the longitudinal axis of the fuel pressure governor may be in the longitudinal direction of the vehicle, horizontal in the width direction of the vehicle, tilted forward, tilted upward, or in a combination of directions.

The coiled part may be in a position other than between the vehicle body frame and the fuel injection device, e.g., a position above the vehicle body frame or below the fuel injection device. The coiled part may be provided at any position.

The means interposed in the connecting line is also not limited to a folded duct part, and other means may also be used.

INDUSTRIAL APPLICABILITY

The present invention is suitable in a motorcycle in which a fuel filter and a fuel pressure governor are provided outside a fuel tank, and a multi-fuel internal combustion engine is provided on the outflow side of the fuel pressure governor.

The invention claimed is:

1. A fuel feeding device for feeding fuel from a fuel tank to a multi-fuel engine operated by using fuel in which alcohol and gasoline are mixed at an arbitrary ratio, the fuel feeding device comprising:
   a fuel pressure governor for maintaining pressure of the fuel from the fuel tank at a constant pressure;
   a fuel injection device for injecting the fuel to the engine;
   a connecting line for connecting the fuel pressure governor and the fuel injection device, the connecting line having a predetermined internal volume;
   an oxygen sensor for measuring an amount of oxygen included in exhaust gas of the engine; and
   a control unit for estimating a concentration of the alcohol in the fuel on the basis of the measured value of oxygen sensed by the oxygen sensor, and for controlling the fuel injection rate,
   wherein the predetermined internal volume of the connecting line is a volume equal to or greater than an amount of fuel estimated to be sufficient to supply the engine during a warm-up period lasting from an initial cold startup of the engine until the oxygen sensor reaches a measurement-enabling temperature under a set of predetermined operating conditions.

2. The fuel feeding device of claim 1, wherein the fuel feeding device is mounted to a vehicle which comprises:
   a vehicle body frame;
   a fuel tank attached to the vehicle body frame;
   a fuel pump for pumping fuel to the engine, the fuel pump being provided to the fuel tank; and
   a fuel filter for filtering the fuel, the fuel filter being provided between the fuel pump and the fuel pressure governor.

3. The fuel feeding device of claim 1, wherein the connecting line has a U-shaped curve disposed partway in the connecting line.

4. The fuel feeding device of claim 3, wherein the fuel pressure governor is provided so that a longitudinal shaft thereof is in the vertical direction, an entry port to which the connecting line is connected, the entry port being provided to the fuel injection device, is provided above the fuel pressure governor, and the U-shaped curve is provided between the entry port and a fuel exit port provided to the fuel pressure governor.

5. The fuel feeding device of claim 2, wherein the connecting line has a coiled part disposed partway in the connecting line.

6. The fuel feeding device of claim 5, wherein the coiled part is provided between the vehicle body frame and the fuel injection device.

7. The fuel feeding device of claim 1, wherein the connecting line has a folded duct part folded such that a flow path leads back and forth partway in the connecting line.

8. The fuel feeding device of claim 1, wherein the connecting line is provided with a case having a labyrinth passage, the case being interposed partway in the line.

9. The fuel feeding device of claim 2, wherein the fuel injection device is provided below the fuel tank, the fuel pressure governor is provided behind the fuel tank and below a vehicle occupant seat on which a vehicle occupant sits, and the connecting line is provided so as to extend forward from the vehicle occupant seat in a longitudinal direction of the vehicle body frame.

10. The fuel feeding device of claim 1, wherein the connecting line includes a compressed flow path portion therein, in which a flow path includes a plurality of first segments in which fuel travels in a first direction, and a plurality of second segments in which fuel travels in a second direction which is substantially opposite to the first direction.

11. A fuel feeding device for feeding fuel from a fuel tank to a multi-fuel engine operated by using fuel in which alcohol and gasoline are mixed at an arbitrary ratio, the fuel feeding device comprising:
    a fuel pressure governor for maintaining pressure of the fuel from the fuel tank at a constant pressure;
    a fuel injection device for injecting the fuel to the engine;
    a connecting line for connecting the fuel pressure governor and the fuel injection device, the connecting line comprising a folded duct part folded such that a flow path leads back and forth partway in the connecting line, the connecting line having a predetermined internal volume;
    an oxygen sensor for measuring an amount of oxygen included in exhaust gas of the engine; and
    a control unit for estimating a concentration of the alcohol in the fuel on the basis of the measured value of oxygen sensed by the oxygen sensor, and for controlling the fuel injection rate.

12. The fuel feeding device of claim 11, wherein the fuel feeding device is mounted to a vehicle which comprises:
    a vehicle body frame;
    a fuel tank attached to the vehicle body frame;
    a fuel pump for pumping fuel to the engine, the fuel pump being provided to the fuel tank; and
    a fuel filter for filtering the fuel, the fuel filter being provided between the fuel pump and the fuel pressure governor.

13. The fuel feeding device of claim 11, wherein the connecting line has a U-shaped curve disposed therein.

14. The fuel feeding device of claim 13, wherein the fuel pressure governor is provided so that a longitudinal shaft thereof is in the vertical direction, an entry port to which the connecting line is connected, the entry port being provided to the fuel injection device, is provided above the fuel pressure governor, and the U-shaped curve is provided between the entry port and a fuel exit port provided to the fuel pressure governor.

15. The fuel feeding device of claim 12, wherein the connecting line has a coiled part disposed therein.

16. The fuel feeding device of claim 15, wherein the coiled part is provided between the vehicle body frame and the fuel injection device.

17. The fuel feeding device of claim 11, wherein the connecting line is provided with a case having a labyrinth passage, the case being interposed partway in the line.

18. The fuel feeding device of claim 11, wherein the connecting line includes a compressed flow path portion therein, in which a flow path includes a plurality of first segments in which fuel travels in a first direction, and a plurality of second segments in which fuel travels in a second direction which is substantially opposite to the first direction.

* * * * *